(12) United States Patent
Asplund et al.

(10) Patent No.: US 9,596,019 B2
(45) Date of Patent: Mar. 14, 2017

(54) POLARIZATION CO-ORDINATION

(75) Inventors: Henrik Asplund, Stockholm (SE);
 David Astely, Bromma (SE); Johan Nystrom, Uppsala (SE); Tobias Tynderfeldt, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1045 days.

(21) Appl. No.: 12/992,921

(22) PCT Filed: May 28, 2008

(86) PCT No.: PCT/SE2008/050626
§ 371 (c)(1),
(2), (4) Date: Nov. 16, 2010

(87) PCT Pub. No.: WO2009/145685
PCT Pub. Date: Dec. 3, 2009

(65) Prior Publication Data
US 2011/0065390 A1    Mar. 17, 2011

(51) Int. Cl.
| | | |
|---|---|---|
| *H04B 1/38* | (2015.01) | |
| *H04B 7/10* | (2006.01) | |
| *H01Q 1/24* | (2006.01) | |
| *H01Q 21/24* | (2006.01) | |
| *H04L 5/04* | (2006.01) | |
| *H04L 5/06* | (2006.01) | |

(52) U.S. Cl.
CPC ............... *H04B 7/10* (2013.01); *H01Q 1/246* (2013.01); *H01Q 21/24* (2013.01); *H04L 5/04* (2013.01); *H04L 5/06* (2013.01)

(58) Field of Classification Search
USPC .................................................. 455/63.1, 73
See application file for complete search history.

(56) References Cited

U.S. PATENT DOCUMENTS

| | | | |
|---|---|---|---|
| 6,445,926 B1 | 9/2002 | Boch et al. | |
| 2002/0128046 A1 | 9/2002 | Fukuhara et al. | |
| 2004/0053620 A1* | 3/2004 | Garrison et al. | ............ 455/448 |
| 2004/0121740 A1 | 6/2004 | Miyano | |
| 2005/0036474 A1 | 2/2005 | Zhang et al. | |
| 2009/0227292 A1* | 9/2009 | Laroia et al. | ............ 455/562.1 |

* cited by examiner

*Primary Examiner* — Hsin-Chun Liao
(74) *Attorney, Agent, or Firm* — Patent Portfolio Builders, PLLC

(57) ABSTRACT

The present invention relates to a group (G1, G2) of at least two transceiver units (1, 2; 3, 4) in at least one wireless communication system. The transceiver units (1, 2; 3, 4) in the group (G1, G2) are arranged for wireless communication with at least one other transceiver unit. The transceiver units (1, 2; 3, 4) in the group (G1, G2) are arranged to transmit signals with polarizations that are essentially parallel to each other when received by at least one transceiver unit for which the transmitted signals (5, 6) constitutes interference. The present invention also relates to a method, a node and a transceiver unit.

15 Claims, 3 Drawing Sheets

POLARIZATION CO-ORDINATION

CROSS-REFERENCE TO RELATED APPLICATION

This application is a 35 U.S.C. §371 National Phase Entry Application from PCT/SE2009/050626, filed May 28, 2008, and designating the United States.

TECHNICAL FIELD

The present invention relates to a group of at least two transceiver units in at least one wireless communication system. The transceiver units in the group are arranged for wireless communication with at least one other transceiver unit.

The present invention also relates to a method in a group according to the above.

The present invention also relates to a node in a wireless communication system, and also a transceiver unit in a wireless communication system.

BACKGROUND

In cellular systems for wireless communication, base stations of different kinds are normally used. A typical base station (BS) in a cellular system is often deployed above roof-top level or in a high mast, increasing its coverage area. This gives a high likelihood for line-of-sight between base stations, which can lead to significant BS-to-BS station interference, in particular when a relatively high transmission power is used.

In a Time Division Duplex (TDD) system, uplink data traffic (to a BS) and downlink data traffic (from a BS) use the same frequency carrier, but are separated in time. During a first time period, the downlink data traffic is active, and during a second time period the uplink data traffic is active, the downlink data traffic and uplink data traffic not being active at the same time.

This may cause problem if two cells have different periods where uplink data traffic and downlink data traffic are active, which results in a period of overlap, where uplink data traffic and downlink data traffic are active at the same time, resulting in interference. The interference is also present between mobile stations (MS), such as cell phones, and relay nodes.

In a TDD system, the BS-to-BS and MS-to-MS station interference within the system can be severe since transmission and reception are done on the same frequency. Even if the two cells are located in adjacent carrier frequencies, the interference could be significant.

The interference situation is improved if all base stations synchronize their transmission and reception time windows. Due to propagation delay, guard periods, or silent periods, are needed to allow the transmissions from far away base stations to decay to an acceptable level. Time synchronized interference to neighboring carriers can be suppressed similarly. For the case with two unsynchronized TDD systems transmitting on adjacent frequency bands, the interference in uplink slots from base stations transmitting in downlink on the neighboring carrier can be very strong.

Due to propagation delay over the air, the interference from neighbouring base stations transmitting on the same carrier will be high directly after the switch from DL transmission to UL reception.

In a Frequency Division Duplex (FDD) system, the uplink and downlink activities use different frequencies for their carriers, and thus the BS-BS, and MS-MS, interference is typically highly suppressed by the use of duplex filters and large separation between the uplink and downlink bands.

However, in some cases FDD systems are deployed at frequencies such that the downlink of one FDD system is close to the uplink of the other, e.g. use of both 800 MHz and 900 MHz frequency plans.

Furthermore, in relevant sharing scenarios, FDD and TDD systems may be required to coexist at frequency separations which are much less separated than the typical FDD duplex distance. Additional guard bands and conformance to tight spectrum masks may be required for minimizing interference between the two systems.

BS-to-BS interference can also be reduced by increasing the separation between base stations or by avoiding line-of-sight situations. However, this severely limits the operator choice of deployment alternatives and site locations. Furthermore, in a multi operator scenario, it may not be in one operator's interest to reduce the interference another operator experiences, since they are competitors.

There are a number of drawbacks with the existing solutions to the interference problems discussed:

- Guard bands and guard periods represent unused resources and lead to lower spectrum efficiency.
- Sharpening the filter requirements only work when the interferer and the victim of the interference are located on different carriers, and even then the filters present physical entities with certain costs and limitations
- Increased physical separation is often not a practical solution and severely limits the operators site location choices. If the second system is deployed after the first system, the first systems locations are already in place and choices are limited.
- Synchronization in TDD may be difficult or even impossible if there are two different technology TDD systems (e.g WiMax and LTE/TDD) deployed on neighboring frequency bands.
- Synchronization between uplink and downlink usage is in general not possible in a sharing situation between a TDD and a FDD system, e.g. WiMax or LTE/TDD on the one hand and LTE/FDD or WCDMA or WCDMA HSPA on the other hand.

There clearly exists a need to obtain an arrangement that provides reduced interference between transceiver equipment such as mobile station, base stations and relay nodes, which arrangement does not have the drawbacks discussed above.

SUMMARY

It is an object of the present invention to reduce interference between transceiver equipment such as mobile station, base stations and relay nodes.

This object is solved by means of a group of at least two transceiver units in at least one wireless communication system. The transceiver units in the group are arranged for wireless communication with at least one other transceiver unit. The transceiver units in the group are arranged to transmit signals with polarizations that are essentially parallel to each other when received by at least one transceiver unit for which the transmitted signals constitutes interference.

The object is also solved by means of a method in a group of at least two transceiver units in at least one wireless communication system. The method comprises the steps:

using the transceiver units in the group for wireless communication with at least one other transceiver unit, and controlling the transceiver units in the group to transmit signals using polarizations that are essentially parallel to each other when received by at least one transceiver unit for which the transmitted signals constitutes interference.

According to one aspect of the present invention, the transceiver units in the group are arranged to transmit signals during a first set of time intervals and receive signals during a second set of time intervals, the first set of time intervals and the second set of time intervals being separated from each other.

According to another aspect of the present invention, the transceiver units in the group are arranged to transmit signals using a first set of frequency bands and receive signals using a second set of frequency bands, the first set of frequency bands and the second set of frequency bands being separated from each other.

According to another aspect of the present invention, the transceiver units are arranged for transmitting signals by means of two polarizations during certain time periods or frequency intervals, and by means of one polarization during other time periods or frequency intervals.

According to another aspect of the present invention, each transceiver unit comprises a double-polarized antenna arranged for both transmission and reception.

According to another aspect of the present invention, each transceiver unit in the group comprises a single-polarized antenna function arranged for both transmission and reception. Each single-polarized antenna function has vertical and horizontal polarization components of equal amplitude, such that any transceiver unit in the group has a polarization for reception that is essentially orthogonal to the polarization of a signal transmitted from any other transceiver unit in the group.

The object is also solved by means of a node in a wireless communication system, the node comprising means for communication with at least one transceiver unit and determining means for evaluating data. The node is arranged to control the polarization configuration of said transceiver unit.

The object is also solved by means of a transceiver unit in a wireless communication system, the transceiver unit comprising means for communication with other units. The transceiver unit is arranged for receiving control signals regarding its polarization configuration.

According to one aspect of the present invention, the control is performed based on data received by the node from said transceiver unit, the data being evaluated by the determining means. The control may comprise at which certain time periods a certain transceiver should transmit signals, and at which certain time periods that transceiver should receive signals, and which polarization configuration that should be used during each time period.

According to another aspect of the present invention, the transceiver unit (24) receives control signals from determining means comprised in the transceiver unit itself, or from determining means comprised in the node.

The transceiver unit is arranged for transmitting by means of two polarizations during certain time periods or frequency intervals, and by means of one polarization during other time periods or frequency intervals.

Other aspects of the present invention are disclosed in the dependent claims.

A number of advantages are obtained by means of the present invention. For example:

Interference between receivers is significantly reduced.

The guard bands and guard periods may be reduced.

Co-existence is facilitated for services on neighbouring frequency bands.

The requirement of very little additional hardware in order to implement the present invention means that it is obtained for a relatively low cost.

BRIEF DESCRIPTION OF THE DRAWINGS

The present invention will now be described more in detail with reference to the appended drawings, where.

DETAILED DESCRIPTION

Figure 1:
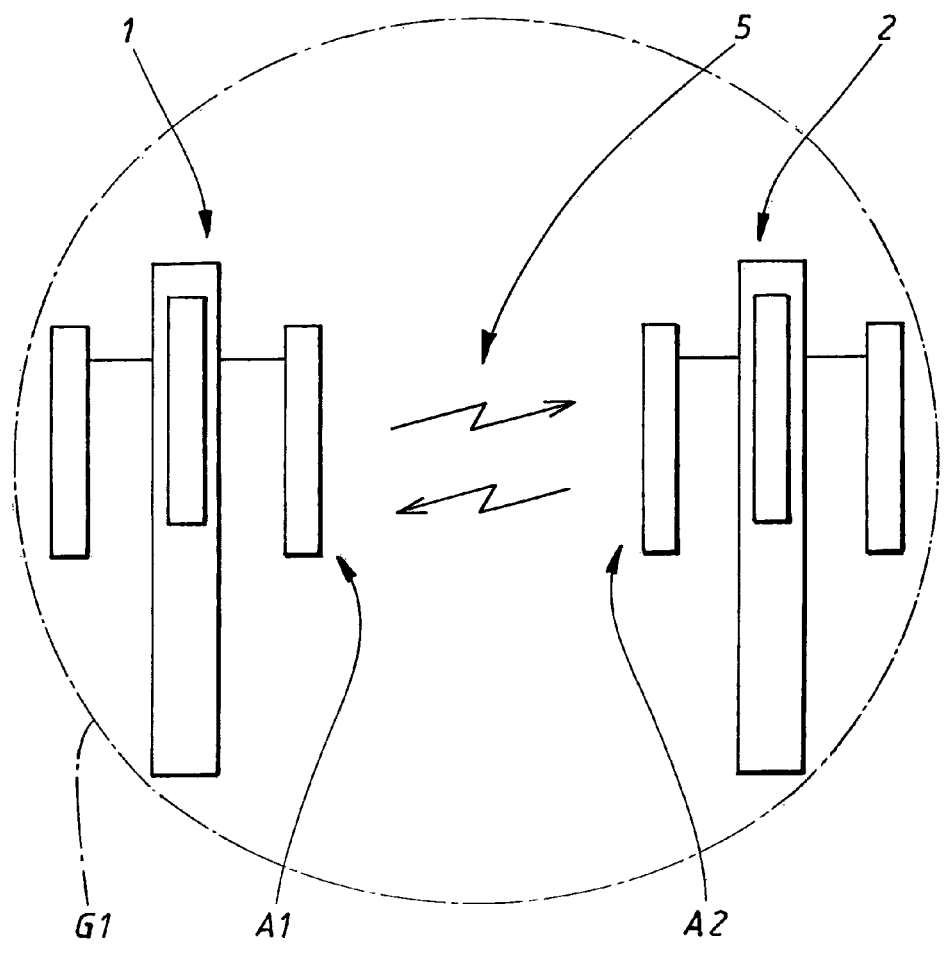
FIG. 1 shows a simplified view of two base stations and two mobile stations.
Figure 1:
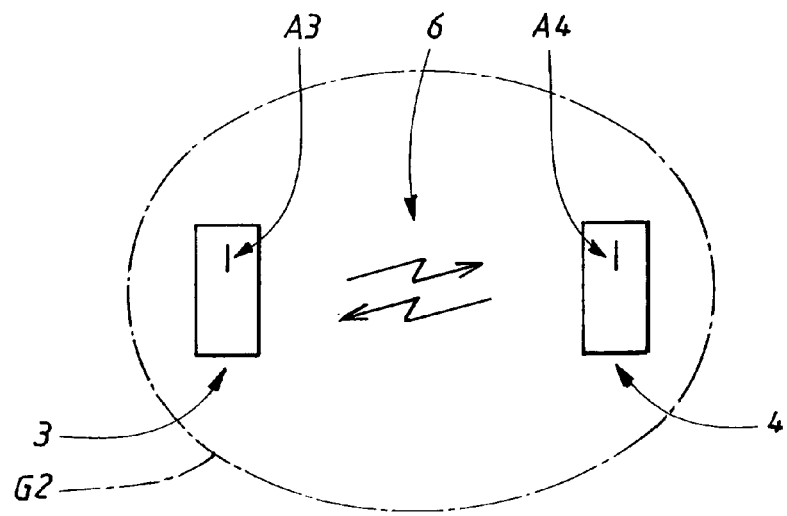

With reference to FIG. 1, there is a first base station 1, a second base station 2, a first mobile station 3 and a second mobile station 4. The first base station 1 communicates with the first mobile station 3, and the second base station 2 communicates with the second mobile station 4. The first base station 1 and the second base station 2 form a first group G1 of transceiver units, and the first mobile station 3 and the second mobile station 4 form a second group G2 of transceiver units.

The first base station 1 comprises a first set of antennas A1 and the second base station 2 comprises a second set of antennas A2. Each mobile station 3, 4 comprises an antenna function A3, A4.

There will be a certain interference 5 between the base stations 1, 2; when they transmit to their corresponding mobile station 3, 4, the transmitted power from the first base station 1 will be received by the second base station 2 and vice versa. In the same way, there will be a certain interference 6 between the mobile stations 3, 4.

The interference 5 between the base stations 1, 2 will be most severe in situations where there is line-of-sight (LOS) between the two base stations 1, 2. The polarization of the transmitted electromagnetic wave is preserved during free space propagation. When there is very limited scattering and multipath propagation, as is the case for base station-to-base station channels, the conditions will be similar to free space and hence the polarization is expected to be mainly preserved.

Considering the interference received at the first base station 1, if the interference is received from several other base stations or relays (not shown), which may be differently polarized, the polarization state of that interference will be a weighted vector sum of the polarization of each interfering base station. The weights will depend on the transmitted signals and hence the net polarization will vary randomly. This random polarization can be decomposed into one component that is parallel to the polarization of the desired signal (transmitted from a mobile in the cell) and one component that is orthogonal to the desired signal.

According to the present invention, the first base station 1 and the second base station 2 transmit signals using a first polarization, and the first base station 1 and the second base station 2 receive signals using a second polarization, where the first polarization is essentially orthogonal to the second polarization. The present invention thus lies in the use of polarization co-ordination to reduce interference.

Preferably, the first base station 1 and the second base station 2 may be arranged to transmit signals during a first set of time intervals and receive signals during a second set of time intervals, the first set of time intervals and the second set of time intervals for each base station being separated from each other, i.e. not being overlapping within each base station.

The idea of the present invention is thus to coordinate the use of polarization among base station transmitters/receiver (transceivers) such that the interference sensed by any given base station receiver is concentrated to one plane in the polarization dimension, the interference signals thus having essentially parallel polarizations. According to one aspect of the invention, this plane is essentially orthogonal to the plane in which interference is received.

Furthermore, if the interference sensed by any given base station receiver is concentrated to one plane in the polarization dimension, a receiver may then suppress this interference using either well-known diversity techniques such as maximum ratio combining (MRC) or interference rejection combining (IRC), or a novel one-antenna static interference avoidance configuration described in this invention.

Figure 2:
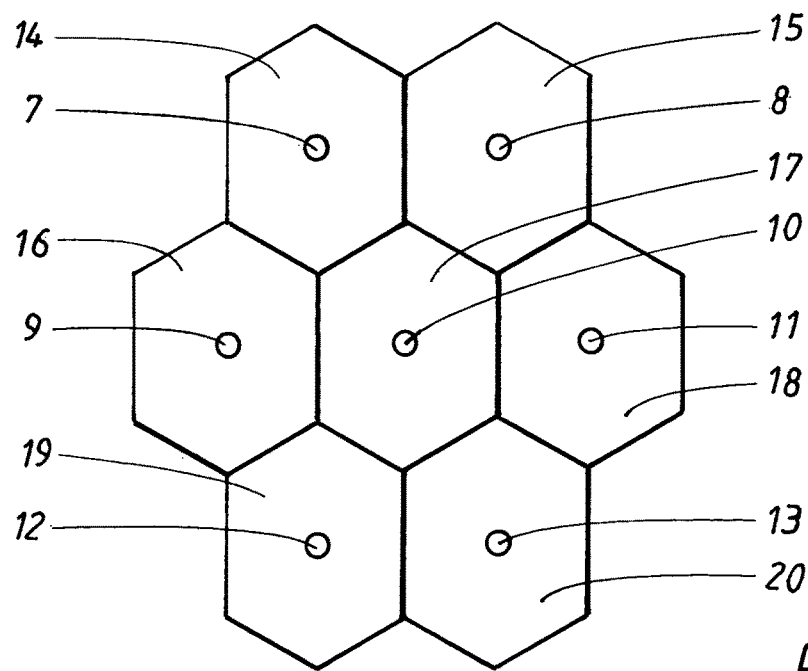
FIG. 2 shows a simplified top view of a cellular structure.

A more general case will be discussed below. FIG. 2 shows a top view of a base station cell pattern with a number of base stations 7, 8, 9, 10, 11, 12, 13 within corresponding cell areas 14, 15, 16, 17, 18, 19, 20, the base stations 7, 8, 9, 10, 11, 12, 13 being configured to transmit signals using a first common polarization p1. Furthermore, all the base stations 7, 8, 9, 10, 11, 12, 13 are configured to receive signals using a second common polarization p2. The first common polarization p1 is essentially orthogonal to the second common polarization p2.

The base stations 7, 8, 9, 10, 11, 12, 13 are thus equipped with a respective p1-polarized antenna and p2-polarized antenna, for example a double-polarized antenna or two separate single-polarized antennas. A second receive antenna with p1-polarization may optionally be used for providing diversity in situations where the base station-to-base station interference is not dominating.

Figure 3:
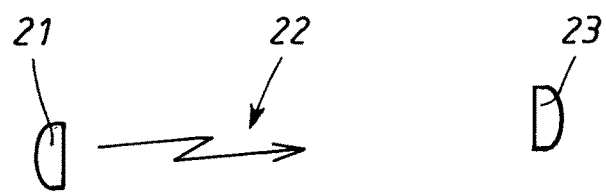
FIG. 3 shows a simplified top view of two antennas.

With reference to FIG. 3, showing a top view of a first single-polarized base station antenna 21 and a second single-polarized base station antenna 22, the previous configuration can be further simplified from the observation that the receive polarization of an antenna is the mirror image of the transmit polarization due to the reversed direction of travel of the electromagnetic wave. The effective antenna area of the first single-polarized base station antenna 21 is arranged to face the effective antenna area of the second single-polarized base station antenna 22.

The first single-polarized base station antenna 21 has vertical and horizontal polarization components of equal amplitude, such as +45° slant linear, circular, or some elliptic polarizations. The second single-polarized base station antenna 22 has the same polarization as the first single-polarized base station antenna 21, this common polarization having the properties above. At the second single-polarized base station antenna 22, a signal 23 transmitted from the first single-polarized base station antenna 21 will have a polarization that is essentially orthogonal to the polarization of the second single-polarized base station antenna 22, and vice versa.

The base station antennas 21, 22 may be dual polarized, each having single-polarized antenna functions according to the above.

This mirror image property allows a single-polarized antenna to be used for both transmission and reception at each base station, still providing the same interference suppression as when separate transmit and receive antennas are used.

The key point is, of course, that the vertical and horizontal components of the polarization need to have equal amplitude, which limits the choice of the common polarization to a phase offset between the two components. A phase offset of 0 or 180 degrees results in linear slant polarization, +45° or −45°, a 90° or 270° offset gives circular polarization, and other phase offsets result in elliptical polarization. For this simplified configuration, self-interference, i.e. reflections back to the transmitting base station from objects in the propagation area, is not suppressed, since a single reflection will also mirror the polarization of the wave.

The general inventive concept of the present invention may be used in different ways in order to obtain an enhanced performance for different communication systems. For example, where Multiple Input Multiple Output (MIMO) is used, it is desired to use different polarizations to transfer uncorrelated information in multiple information streams.

In order to take advantage of the polarization domain both for interference reduction and for spatial multiplexing, the polarization coordination is coupled with the time slot structure in TDD, or the frequency band arrangement in FDD, such that the polarization coordination to reduce interference according to the present invention is only used on those time slots or at those frequencies where the base station-to-base station interference is the strongest, for example at the transition between transmission and reception. Full utilization of the polarization domain during transmission is allowed at other time slots or frequency bands.

Generally, for TDD, this means that a transceiver, such as a base station, is arranged to transmit signals during a first set of time intervals and receive signals during a second set of time intervals, the first set of time intervals and the second set of time intervals being separated from each other.

Preferably, during a part of each time interval in the first set of time intervals, two polarizations are used for transmission, while during the remaining part of each time interval, only one polarization is used for transmission.

The same general approach is applicable for FDD.

The idea of using polarization coordination to reduce base station-to-base station interference in only some time slots is also relevant for the case when a base station in an FDD system is interfering or is interfered by a base station in a TDD system. The reason for this is that, since a TDD base station has non-overlapping transmission and reception periods, the FDD base station will only be subjected to interference from the TDD base station during certain time slots when the TDD base station is in transmission mode, and will similarly only subject the TDD base station to interference during time slots when the TDD base station is in reception mode.

Thus, a transceiver unit (24; 31, 32, 33) may be arranged for transmitting by means of two polarizations during certain time periods or frequency intervals, and by means of one polarization during other time periods or frequency intervals, in order to achieve the best possible interference rejection.

In order to implement the polarization coordination according to the present invention, the common transmit polarization has to be known at the time of deployment of a base station. This requirement can be relaxed by introducing remote control of the transmit polarization.

Figure 4:
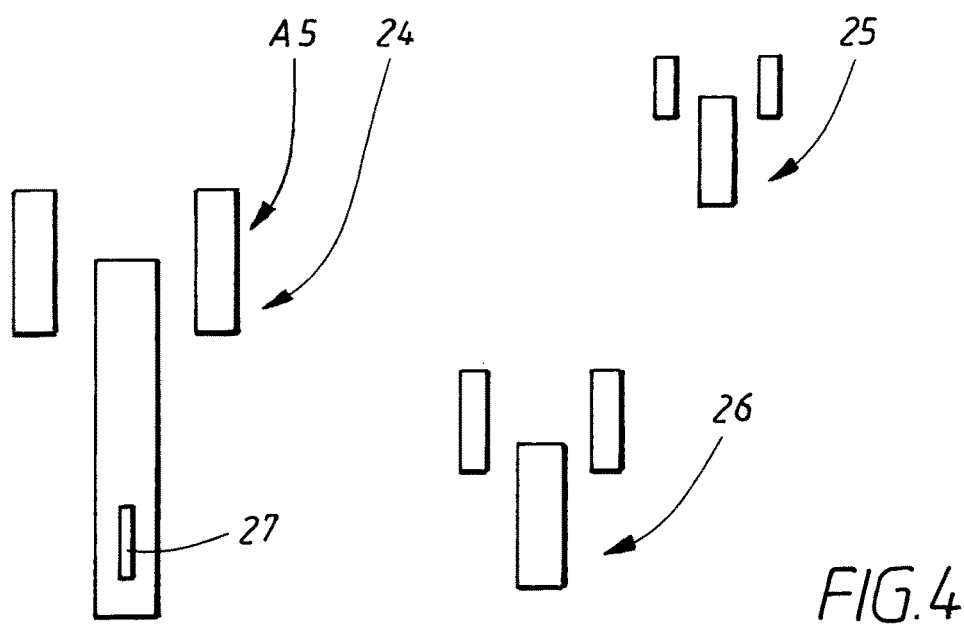
FIG. 4 shows a simplified view of a self-configuring base station.

As an alternative to this, with reference to FIG. 4, it may be desirable to implement a self-configuration arrangement for a communication system that takes advantage of the present invention. Such a self-configuration arrangement might comprise the following steps for a certain base station 24:

The base station 24 measures the polarization state of the interference from other base stations 25, 26.

The transmit polarization at the base station 24 is made as similar as possible to the measured interference polarization, either by antenna selection or by coherent or incoherent combination of two transmit antennas with different polarizations.

Generally, the base station 24 receives control signals from determining means 27 comprised in the base station 24, the control signals being based on data received by the base station 24, the data being evaluated by the determining means 27. The base station 24 comprises an antenna function A5, or other suitable communicating means As a summary, the present invention deals with interference suppression and is especially relevant when one strong transmitter, e.g. a base station, relay node or mobile station, is located relatively close in space and frequency to a receiver, e.g. another base station, relay node or mobile station, receiving partially or fully during a certain time period. The invention will enable suppression of interference during the overlapping period by means of polarization coordination.

Figure 5:
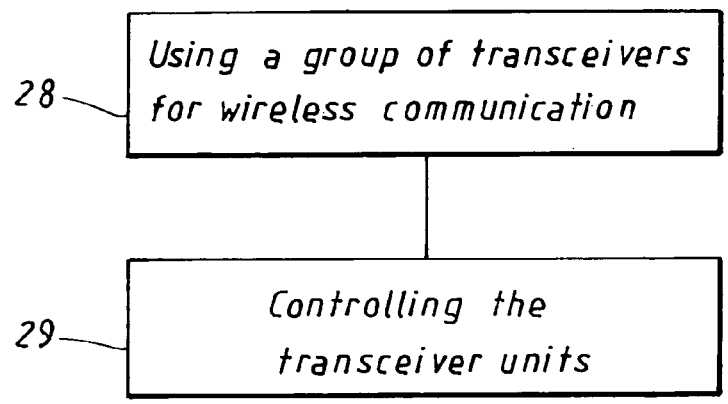
FIG. 5 shows a flowchart of a method according to the invention.

With reference to FIG. 5, the present invention also relates to a method in a group G1, G2 of at least two transceiver units 1, 2; 3, 4 in at least one wireless communication system, the method comprising the steps:

28: using the transceiver units 1, 2; 3, 4 in the group G1, G2 for wireless communication with at least one other transceiver unit,

29: controlling the transceiver units 1, 2; 3, 4 in the group G1, G2 to transmit signals using polarizations that are essentially parallel to each other when received by at least one transceiver unit for which the transmitted signals 5, 6 constitutes interference.

The present invention is not limited to the embodiment examples described above, but may vary freely within the scope of the appended claims. For example, it should be understood that all reduction of interference between base stations using polarization coordination according to the present invention as described in the examples above, may also be implemented for mobile stations, such as cell phones and laptops. Generally, the present invention may be used for reduction of interference between any suitable transmitter/receiver (transceiver) units.

The polarization co-ordination is performed for the transceiver units that are present in a group G1, G2, where the group may contain base stations 1, 2, mobile terminals 3, 4, other types of nodes or a mix between for example base stations 1, 2 and mobile terminals 3, 4. The number of the units in a group may vary, but should be at least two.

The present invention is applicable for two or more neighboring wireless communication systems, where interference occurs between the neighboring wireless communication systems. If there are different owners of such neighboring wireless communication systems, agreements have to be made between the owners to use the concept of the present invention.

When there is more than one interfering transceiver unit, it is a general concept of the present invention that these interfering transceiver units transmit interfering signals using essentially parallel polarizations. In this way, a further transceiver unit may be arranged to suppress the interfering signals, since they all have the same polarization, in other word co-ordinated polarizations.

Suppression may be performed in many ways as mentioned previously, for example maximum ratio combining (MRC) or interference rejection combining (IRC). One preferred means of suppression is that the further transceiver unit uses an essentially orthogonal polarization for reception.

Figure 6:
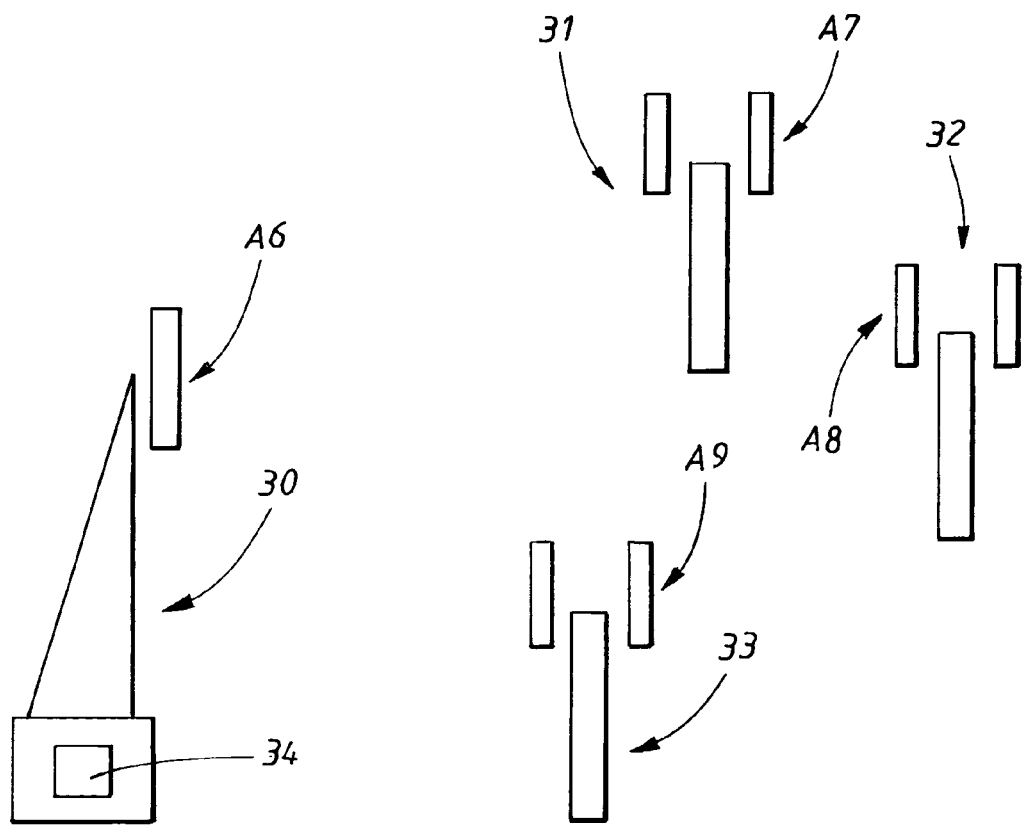
FIG. 6 shows a simplified configuration with one controlling node.

With reference to FIG. 6, it is possible that an additional node 30 is added, for example an operation and maintenance (O&M) node, which node 30 controls the transmitting polarization of the transceivers 31, 32, 33, for example by communicating with them by means of for example an antenna function A6 or other suitable communicating means, the transceivers 31, 32, 33 in turn comprising suitable antenna functions A7, A8, A9, keeping a register over the transmitting polarization of the transceivers, controlling change of the transmitting polarization of the transceivers, and turning the polarization co-ordination according to the present invention on and off dependent on the present situation.

Preferably, the control is performed based on data received by the node 30 from said transceiver units 31, 32, 33, the data being evaluated by determining means 34 comprised in the node 30.

The node 30 may furthermore be arranged to control at which certain time periods a certain transceiver 31, 32, 33 should transmit signals, and at which certain time periods that transceiver 31, 32, 33 should receive signals, and which polarization configuration that should be used during each time period. The same is applicable for the transceiver 24 with self-configuration, as discussed with reference to FIG. 4.

The node 30 may itself be constituted by a transceiver unit.

The invention claimed is:

1. A group of at least two transceiver units in at least one wireless communication system, the transceiver units in the group being arranged for wireless communication with at least one other transceiver unit, where the transceiver units in the group are arranged to transmit signals with polarizations that are essentially parallel to each other when received by at least one transceiver unit for which the transmitted signals constitute interference and the essentially parallel polarizations are orthogonal to a polarization for reception when received by said at least one transceiver unit for which the transmitted signals constitute interference, wherein
a) the transceiver units in the group: i) operate in a Time Division Duplex (TDD) mode and not a Frequency Division Duplex (FDD) mode, ii) are arranged to transmit signals during a first set of time intervals and receive signals during a second set of time intervals, the first set of time intervals and the second set of time intervals being separated from each other, and iii) are arranged to transmit the signals such that during a part of each time interval in the first set of time intervals two polarizations are used for transmission, while during the remaining part of each time interval in the first set of time intervals only one polarization is used for transmission, or
b) the transceiver units in the group: i) operate in a FDD mode and not a TDD mode, ii) are arranged to transmit signals using a first set of frequency bands and receive signals using a second set of frequency bands, the first set of frequency bands and the second set of frequency bands being separated from each other, and iii) are arranged to transmit the signals such that for a part of each set of frequency bands two polarizations are used for transmission, while for the remaining part of each set of frequency bands only one polarization is used for transmission.

2. The group according to claim 1, wherein the transceiver units are arranged for transmitting the signals by means of two polarizations during certain time periods or frequency intervals, and by means of one polarization during other time periods or frequency intervals.

3. The group according to claim 1, wherein each transceiver unit in the group comprises a double-polarized antenna arranged for both transmission and reception.

4. The group according to claim 1, wherein each transceiver unit in the group comprises a single-polarized antenna function arranged for both transmission and reception, each single-polarized antenna function having vertical and horizontal polarization components of equal amplitude, such that any transceiver unit in the group has a polarization for reception that is essentially orthogonal to the polarization of a signal transmitted from any other transceiver unit in the group.

5. The group according to claim 1, wherein the transceiver units in the group comprise transceiver units in the form of base stations.

6. The group according to claim 1, wherein the transceiver units in the group comprise transceiver units in the form of laptops and/or cell phones.

7. The group according to claim 1, wherein a node is arranged to control the transmitting polarization of the transceiver units.

8. A method in a group of at least two transceiver units in at least one wireless communication system, the method comprising the steps of: using the transceiver units in the group for wireless communication with at least one other transceiver unit; and controlling the transceiver units in the group to transmit signals using polarizations that are essentially parallel to each other when received by at least one transceiver unit for which the transmitted signals constitute interference; where the essentially parallel polarizations are orthogonal to a polarization for reception when received by said at least one transceiver unit for which the transmitted signals constitute interference, wherein
a) the transceiver units in the group: i) operate in a Time Division Duplex (TDD) mode and not a Frequency Division Duplex (FDD) mode, ii) are arranged to transmit signals during a first set of time intervals and receive signals during a second set of time intervals, the first set of time intervals and the second set of time intervals being separated from each other, and iii) are arranged to transmit the signals such that during a part of each time interval in the first set of time intervals two polarizations are used for transmission, while during the remaining part of each time interval in the first set of time intervals only one polarization is used for transmission, or
b) the transceiver units in the group: i) operate in a FDD mode and not a TDD mode, ii) are arranged to transmit signals using a first set of frequency bands and receive signals using a second set of frequency bands, the first set of frequency bands and the second set of frequency bands being separated from each other, and iii) are arranged to transmit the signals such that for a part of each set of frequency bands two polarizations are used for transmission, while for the remaining part of each set of frequency bands only one polarization is used for transmission.

9. The method according to claim 8, wherein the transceiver units are arranged for transmitting the signals by means of two polarizations during certain time periods or frequency intervals, and by means of one polarization during other time periods or frequency intervals.

10. The method according to claim 8, wherein each transceiver unit in the group uses a double-polarized antenna arranged for both transmission and reception.

11. The method according to claim 8, wherein each transceiver unit in the group uses a single polarized antenna function arranged for both transmission and reception, each single-polarized antenna function having vertical and horizontal polarization components of equal amplitude such that any transceiver unit in the group uses a polarization for reception that is essentially orthogonal to the polarization of a signal transmitted from any other transceiver unit in the group.

12. The method according to claim 8, wherein the method is used in a cellular communication system.

13. The method according to claim 8, wherein a node is arranged to control the transmitting polarization of the transceiver units.

14. The method according to claim 8, wherein each of the transceiver units in the group: i) operate in a TDD mode and not an FDD mode, ii) are arranged to transmit signals during a first set of time intervals and receive signals during a second set of time intervals, the first set of time intervals and the second set of time intervals being separated from each other, and iii) are arranged to transmit signals such that during a part of each time interval in the first set of time intervals two polarizations are used for transmission, while during the remaining part of each time interval only one polarization is used for transmission.

15. The group according to claim 1, wherein each of the transceiver units in the group: i) operate in a TDD mode and not an FDD mode, ii) are arranged to transmit signals during a first set of time intervals and receive signals during a second set of time intervals, the first set of time intervals and the second set of time intervals being separated from each other, and iii) are arranged to transmit signals such that during a part of each time interval in the first set of time intervals two polarizations are used for transmission, while during the remaining part of each time interval only one polarization is used for transmission.

* * * * *